(12) United States Patent
Zhu et al.

(10) Patent No.: US 11,715,860 B2
(45) Date of Patent: Aug. 1, 2023

(54) TRACTION BATTERY VENTING SYSTEM AND VENTING METHOD

(71) Applicant: Ford Global Technologies, LLC, Dearborn, MI (US)

(72) Inventors: Di Zhu, Canton, MI (US); Sumanth Reddy Dadam, New Hudson, MI (US); Vivek Kumar, Troy, MI (US); Vinod Ravi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 17/211,209

(22) Filed: Mar. 24, 2021

(65) Prior Publication Data

US 2022/0311083 A1 Sep. 29, 2022

(51) Int. Cl.
| | |
|---|---|
| *H01M 50/317* | (2021.01) |
| *H01M 10/52* | (2006.01) |
| *B60K 1/04* | (2019.01) |
| *H01M 50/358* | (2021.01) |
| *B60K 13/04* | (2006.01) |
| *F01N 1/00* | (2006.01) |
| *F01N 1/02* | (2006.01) |

(52) U.S. Cl.
CPC ............. *H01M 50/317* (2021.01); *B60K 1/04* (2013.01); *B60K 13/04* (2013.01); *H01M 10/52* (2013.01); *H01M 50/358* (2021.01); *F01N 1/003* (2013.01); *F01N 1/02* (2013.01); *H01M 2220/20* (2013.01)

(58) Field of Classification Search
CPC .. B60K 1/04; B60K 13/04; B60K 6/20; F01N 1/003; F01N 1/02; H01M 50/358; H01M 50/35; H01M 50/30; H01M 50/317; H01M 2/12; B60Y 2200/92
See application file for complete search history.

(56) References Cited

U.S. PATENT DOCUMENTS

| | | | |
|---|---|---|---|
| 8,349,478 | B2 | 1/2013 | Timmons et al. |
| 10,847,772 | B2 | 11/2020 | Kruger |
| 2004/0021377 | A1* | 2/2004 | Mazuka |
| 2012/0003511 | A1* | 1/2012 | Timmons |
| 2014/0370336 | A1 | 12/2014 | Reitzle et al. |

FOREIGN PATENT DOCUMENTS

| | | |
|---|---|---|
| KR | 01828968 | 3/2018 |
| WO | 2012133710 | 4/2012 |

\* cited by examiner

*Primary Examiner* — James A Shriver, II
*Assistant Examiner* — Nicholas R. Kandas
(74) *Attorney, Agent, or Firm* — David B. Kelley; Carlson, Gaskey & Olds, P.C.

(57) ABSTRACT

A traction battery venting system includes, among other things, an engine exhaust system that discharges engine exhaust gas to an area outside an electrified vehicle. The engine exhaust gas is emitted from an internal combustion engine of the electrified vehicle. The system further includes a sound deadening device of the engine exhaust system, a traction battery, and a battery vent system that communicates battery vent byproducts to the engine exhaust system at a position that is downstream from the sound deadening device. The battery vent byproducts are emitted from the traction battery of the electrified vehicle.

18 Claims, 3 Drawing Sheets

TRACTION BATTERY VENTING SYSTEM AND VENTING METHOD

TECHNICAL FIELD

Figure 1:
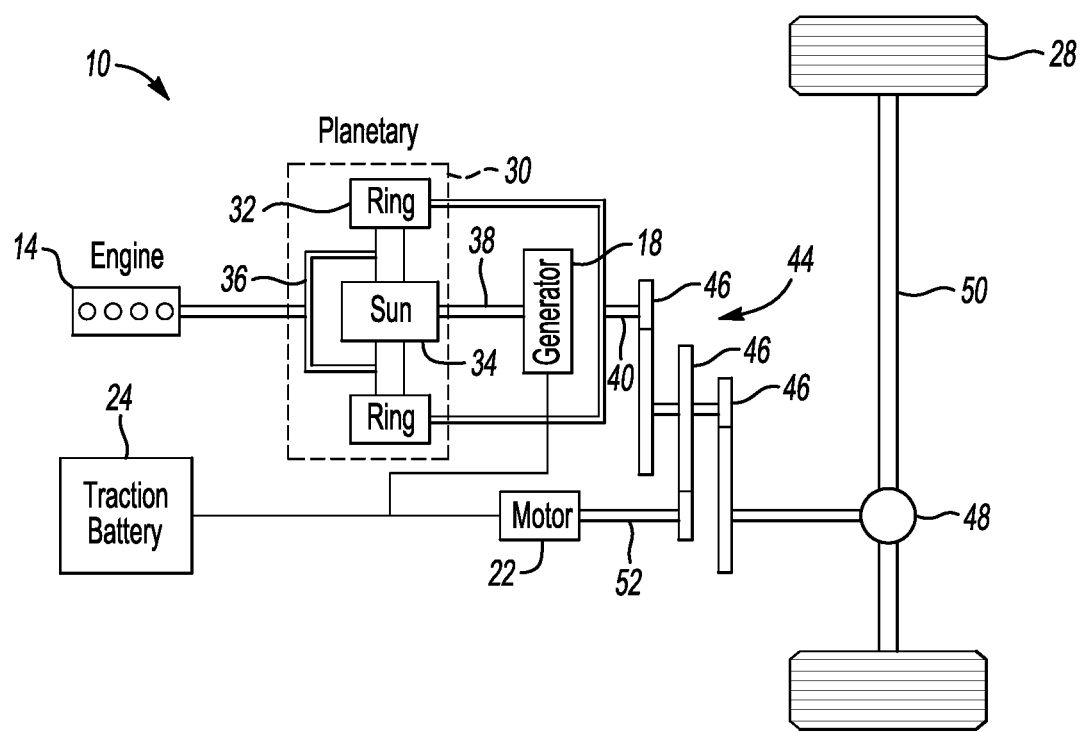

This disclosure relates generally to a traction battery and, in particular, to venting a traction battery.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include a plurality of battery cells arranged in one or more battery arrays within an enclosure.

SUMMARY

A traction battery venting system according to an exemplary aspect of the present disclosure includes, among other things, an engine exhaust system that discharges engine exhaust gas to an area outside an electrified vehicle. The engine exhaust gas is emitted from an internal combustion engine of the electrified vehicle. The system further includes a sound deadening device of the engine exhaust system, a traction battery, and a battery vent system that communicates battery vent byproducts to the engine exhaust system at a position that is downstream from the sound deadening device. The battery vent byproducts are emitted from the traction battery of the electrified vehicle.

In another exemplary embodiment of the foregoing system, the sound deadening device is a muffler.

In another exemplary embodiment of any of the foregoing systems, the sound deadening device comprises a resonator.

Another exemplary embodiment of any of the foregoing systems includes a tailpipe of the engine exhaust system. The battery vent system opens to the tailpipe.

In another exemplary embodiment of any of the foregoing systems, engine exhaust gas entering the tailpipe is not mixed with battery vent byproducts. Engine exhaust gas exiting the tailpipe is mixed with battery vent byproducts.

In another exemplary embodiment of any of the foregoing systems, the engine exhaust system is configured such that the battery vent byproducts flow through no portion of the engine exhaust system other than the tailpipe.

Another exemplary embodiment of any of the foregoing systems includes a valve of the battery vent system. The valve is configured to transition from a flow restricting position to a flow permitting position to permit battery vent byproducts to move to the engine exhaust system.

In another exemplary embodiment of any of the foregoing systems, the valve in the flow restricting position restricts flow of engine exhaust gas through the battery vent system.

In another exemplary embodiment of any of the foregoing systems, downstream is with reference to a direction that the engine exhaust gas flows through the engine exhaust system from the internal combustion engine to the area outside the electrified vehicle.

Another exemplary embodiment of any of the foregoing systems includes the internal combustion engine of the electrified vehicle.

A traction battery venting method according to another exemplary aspect of the present disclosure includes, among other things, using an engine exhaust system to discharge engine exhaust gas from an internal combustion engine to an area outside an electrified vehicle, and using a battery vent system to communicate battery vent byproducts from a traction battery into the engine exhaust system at a position that is downstream from a sound deadening device of the engine exhaust system.

In another example of the foregoing method, the sound deadening device is a muffler.

In another example of any of the foregoing methods, the sound deadening device comprises a resonator.

In another example of any of the foregoing methods, the position is within a tailpipe of the electrified vehicle. The battery vent byproducts flow through no structure of the engine exhaust system other than the tailpipe.

In another exemplary embodiment of any of the foregoing methods, engine exhaust gas entering the tailpipe is not mixed with battery vent byproducts. Engine exhaust gas exiting the tailpipe is mixed with battery vent byproducts.

Another exemplary embodiment of any of the foregoing methods includes, within a tailpipe of the electrified vehicle, mixing engine exhaust gas with battery vent byproducts.

Another exemplary embodiment of any of the foregoing methods includes transitioning a valve from a flow restricting position to a flow permitting position to permit flow of battery vent byproducts through the battery vent system to the engine exhaust system. The valve in the flow restricting position blocks a flow of engine exhaust gas through the battery vent system.

In another example of any of the foregoing methods, downstream is with reference to a direction that the engine exhaust gas flows through the engine exhaust system from the internal combustion engine to the area outside the electrified vehicle.

A traction battery venting method according to yet another exemplary aspect of the present disclosure includes, among other things, within a tailpipe of an electrified vehicle, mixing engine exhaust gas with battery vent byproducts. The method further includes expelling the engine exhaust gas and the battery vent byproducts from the tailpipe to an area that is outside the electrified vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGS.

The various features and advantages of the disclosed examples will become apparent to those skilled in the art from the detailed description. The figures that accompany the detailed description can be briefly described as follows:

FIG. 1 illustrates a highly schematic view of a powertrain for an electrified vehicle.

Figure 2:
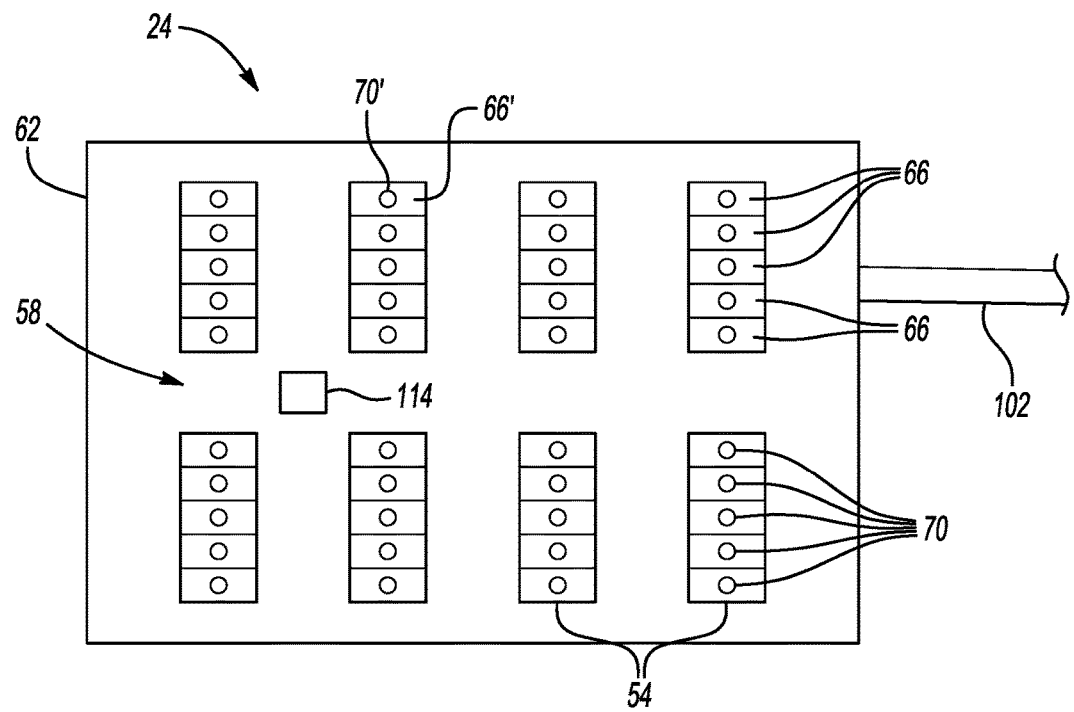

FIG. 2 schematically illustrates a traction battery from the powertrain of FIG. 1.

Figure 3:
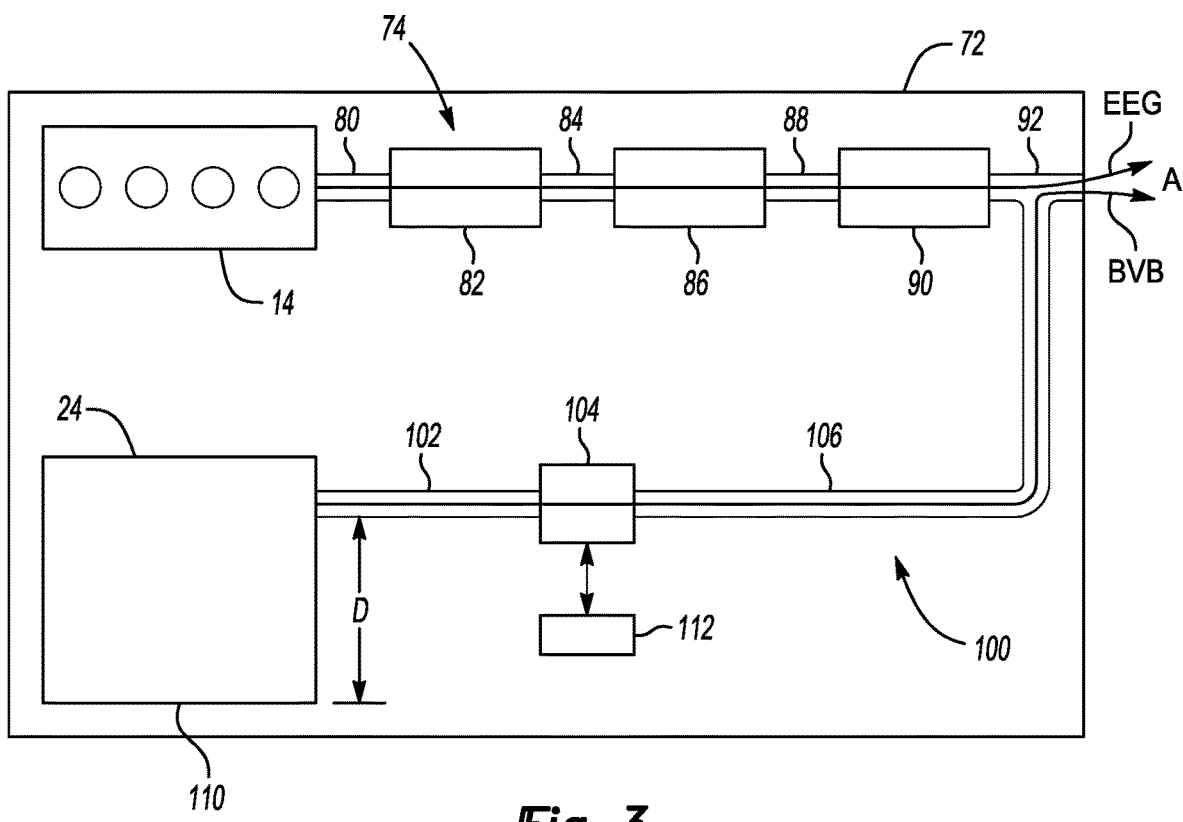

FIG. 3 schematically illustrates an exemplary embodiment of an engine exhaust system and a battery venting system used in connection with the engine and the traction battery in the powertrain of FIG. 1.

Figure 4:
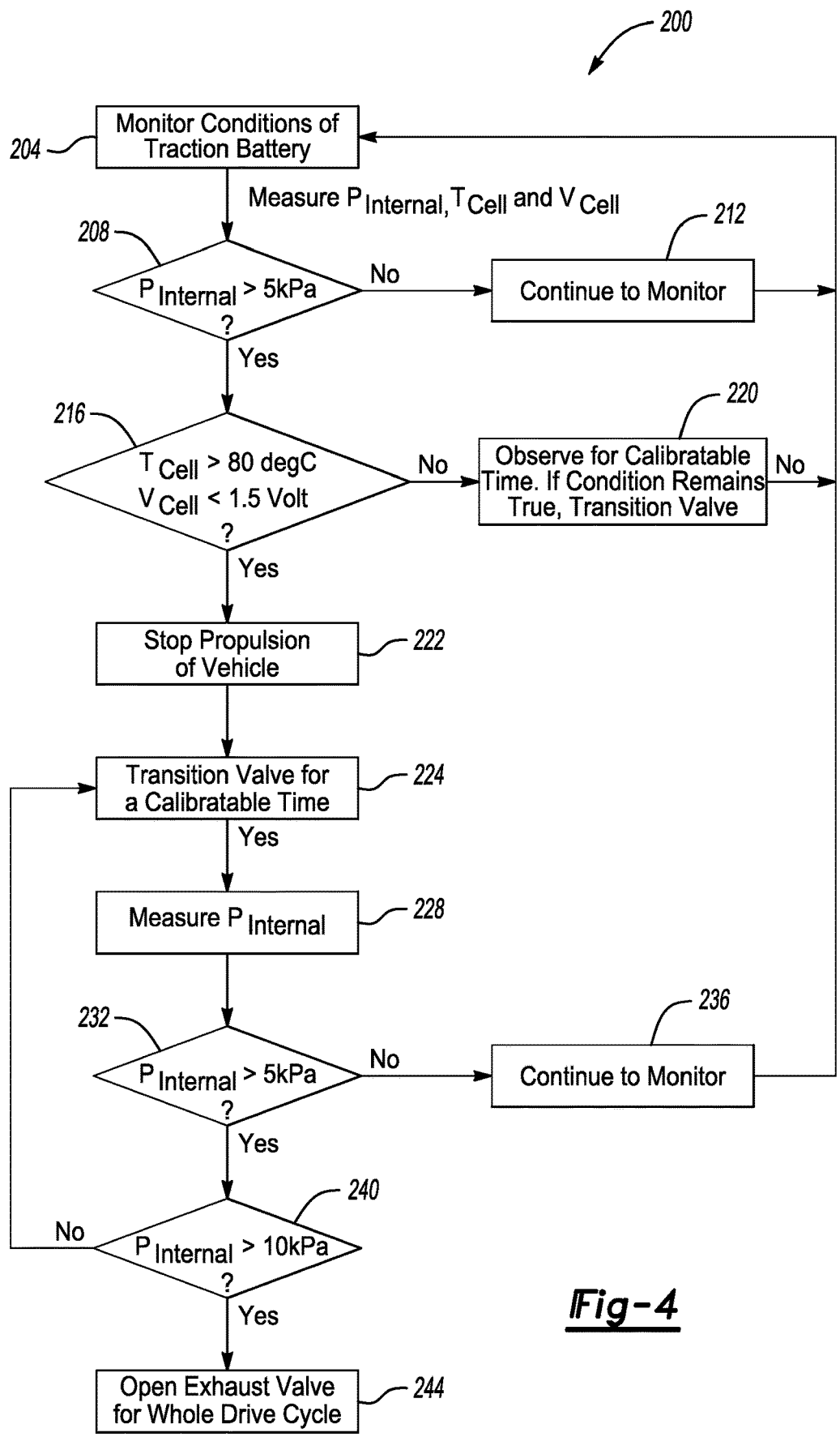

FIG. 4 schematically illustrates a flow of an example method of controlling a valve of the battery venting system of FIG. 3.

DETAILED DESCRIPTION

Gas byproducts can be expelled from the battery cells of a traction battery under certain conditions. The gas byproducts can be at a relatively high pressure and temperature. This disclosure is directed toward venting the gas byproducts from the traction battery and an associated electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a traction battery 24. In this example, the second drive system is considered an electric drive system of the powertrain 10. The first and second drive systems are each capable of generating torque to drive one or more sets of vehicle drive wheels 28 of the electrified vehicle. Although a power-split configuration is depicted in FIG. 1, this teachings of this disclosure extend to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the traction battery 24.

The traction battery 24 is an exemplary electrified vehicle battery. The traction battery 24 may be a high-voltage traction battery that includes a plurality of battery arrays 54 (i.e., battery systems or groupings of battery cells) capable of outputting electrical power to operate the motor 22, the generator 18, and/or other electrical loads of the electrified vehicle for providing power to propel the drive wheels 28. Other types of energy storage devices and/or output devices could also be used to electrically power the electrified vehicle.

With reference now to FIGS. 2 and continuing reference to FIG. 1, the battery arrays 54 are held within an interior 58 of an enclosure 62. In an example, the enclosure 62 can include a tray secured to a lid to provide the interior 58.

The example battery arrays 54 each include a plurality of individual battery cells 66. The battery cells 66 are capable of outputting electrical power to operate the motor 22, the generator 18, and/or other electrical loads of the electrified vehicle having the powertrain 10. Other types of energy storage devices could be used instead of, or in addition to, the traction battery 24 to electrically power the electrified vehicle.

In an exemplary embodiment, the battery cells 66 are prismatic, lithium-ion cells. However, battery cells having other geometries (cylindrical, pouch, etc.), other chemistries (nickel-metal hydride, led-acid, etc.), or both, could alternatively be utilized within the scope of this disclosure. The battery cells 66 can be held within the battery arrays 54 utilizing various other support structures (e.g., spacers, rails, plates, etc.). For drawing clarity, these other support structures are not shown in the Figures.

In addition to the battery arrays 54, other structures of the traction battery 24 can be held within the interior of the enclosure 62. The other structures could include electronic components, busbar systems, etc.

During operation of the powertrain, one or more of the battery cells 66 may produce a significant amount of battery vent byproducts. The battery cells 66 may, for example, produce battery vent byproducts in response to an electrical rerouting or an increased level of thermal energy. The battery cells 66 each includes one or more vents 70. During operation of the powertrain 10, the vents 70 are ordinarily closed. As requried, the vents 70 can rupture, or otherwise open, to permit battery vent byproducts to be expelled from within the respective battery cells 66.

In an example, battery vent products are generated within the battery cell 66', which raises a pressure within the battery cell 66'. The increased pressure ruptures the vent 70' of the battery cell 66' releasing the battery vent byproducts from the battery cell 66' into the interior 58 of the enclosure 62, which increases a pressure within the interior 58.

Battery vent products that are significant enough to rupture the associated vent 70 are occasionally released. That is, the vents 70 of the battery cells 66 are not ruptured whenever the electrified vehicle is operated.

With reference to FIG. 3 and continuing reference to FIGS. 1 and 2, an electrified vehicle 72 includes the powertrain 10. During operation, the internal combustion engine 14 can generate engine exhaust gas EEG. Generally, the engine exhaust gas EEG is a product of combustion. An engine exhaust system 74 discharges the engine exhaust gas EEG from the electrified vehicle 72.

In this example, the example engine exhaust system 74 includes a first exhaust manifold 80, a catalytic converter 82, a second exhaust manifold 84, a muffler 86, an exhaust pipe 88, a resonator 90, and a tailpipe 92. The engine exhaust gas EEG communicates through each of these components when being discharged from the engine 14 to an area A outside the electrified vehicle 72.

The resonator 90 and the muffler 86 are different types of sound deadening devices. The resonator 90 and the muffler 86 are separate and distinct from each other in this example. In other examples, other types and styles of sound deadening devices could be used with the engine exhaust system 74. For example, the engine exhaust system 74 could instead include a resonator combined with a muffler, a resonator without a muffler, or a muffler without a resonator.

In the exemplary embodiment, the engine exhaust gas EEG exits from the engine exhaust system 74 at the tailpipe 92, which opens to the area A that is outside the electrified vehicle 72. The tailpipe 92 opens to a rear of the electrified vehicle 72 having the powertrain 10 in this example.

A battery vent system 100 is used in connection with the engine exhaust system 74. The battery vent system 100 communicates battery vent byproducts BVB from the traction battery 24 to the engine exhaust system 74, which then discharges the battery vent byproducts BVB to the area A outside the electrified vehicle 72. In the exemplary embodiment, the battery vent system 100 communicates the battery vent byproducts BVB to the tailpipe 92 of the engine exhaust system. Within the tailpipe 92, the battery vent byproducts BVB may mix with engine exhaust gas EEG.

The example battery vent system 100 includes a first conduit 102, a valve 104, and a second conduit 106. The first conduit 102 extends from the traction battery 24 to the valve 104. The second conduit 106 extends from the valve 104 to the tailpipe 92.

The first conduit 102 connects to the traction battery 24 at a relatively high position on the traction battery 24. In this example, the first conduit connects to the traction battery 24 at a position that is a distance D above a vertical bottom 110 of the traction battery 24. The distance D can be about ⅔ of an overall height of the traction battery 24. In a specific example, the distance D is 10 centimeters, and an overall height of the pack is 16 centimeters. The battery vent byproducts BVB can be relatively hot and can rise within the interior 58 of the traction battery 24. Coupling the first conduit 102 to a vertically higher area of the traction battery 24 can facilitate communication of the battery vent byproducts BVB from the traction battery 24. Vertical, for purposes of this disclosure, is with reference to ground and an ordinary orientation of the electrified vehicle 72 during operation.

The valve 104 is configured to transition back-and-forth between a flow permitting position and a flow restricting position. In the flow restricting position, the valve 104 blocks flow between the first conduit 102 and the second conduit 106—including a back flow of engine exhaust gas EEG from the second conduit 106 to the first conduit 102. When the valve 104 is in the flow permitting position, battery vent byproducts BVB can move from the first conduit 102, through the valve 104, to the second conduit 106.

The valve 104 can be a unidirectional or one-way valve. A unidirectional valve can, for example, permit flow from the first conduit 102 to the second conduit 106 when in the flow permitting position while blocking flow from the second conduit 106 to the first conduit 102.

Notably, the battery vent system 100 introduces battery vent byproducts BVB into the engine exhaust system 74 at a position that is downstream from the sound deadening devices. Downstream, for purposes of this disclosure, is with reference to a general direction of flow for the engine exhaust gas EEG through the engine exhaust system 74.

In particular, in the exemplary embodiment, the second conduit 106 opens to the tailpipe 92 so that the battery vent byproducts BVB are communicated from the second conduit 106 directly into the tailpipe 92. The tailpipe 92 opens to the area A outside the electrified vehicle 72. Accordingly, both engine exhaust gas EEG and battery vent byproducts BVB can, as needed, be expelled from the electrified vehicle 72 through the tailpipe 92.

Expelling the battery vent byproducts BVB from the electrified vehicle 72 through an outlet of the tailpipe 92 avoids the need to package another outlet from the battery vent system 100 another outlet that would be visible to an observer standing behind the electrified vehicle 72. Also, since the battery vent byproducts BVB do not pass through the sound deadening components of the engine exhaust system 74, the battery vent byproducts BVB do not increase a temperature of the sound deadening components, which could be undesirable. Further, introducing the battery vent byproducts BVB into the tailpipe 92 ensures that the battery vent byproducts BVB are not communicated through other relatively sensitive components of the engine exhaust system 74, such as the catalytic converter 82 or a gasoline particulate filter (not shown).

A control module 112 can be used to control the transition of the valve 104 between the flow permitting position and the flow restricting position. The control module 112 can, in some examples, receive information from one or more sensors 114 (FIG. 2), such as pressure sensors, within the traction battery 24. If the control module 112 interprets the information as meaning that a pressure within the interior 58 has increased such that battery vent byproducts BVB have been emitted through one or more of the vents 70, the control module 112 commands the valve 104 to transition to the flow permitting position.

With reference to FIG. 4 and continued reference to FIGS. 1 to 3, an example method 200 is used by the control module 112 to control transitions of the valve 104 back-and-forth between the flow-restricting position and the flow-permitting position. The control module 112 of can continually execute the method 200 when the electrified vehicle 72 is operating. The control module 112 can be a powertrain control module of the electrified vehicle 72, for example.

The method 200 begins at a step 204 where conditions of the traction battery 24 are monitored by the control module 112. The conditions could include, as previously described, internal pressures within the traction battery 24. The conditions in this exemplary embodiment additionally include temperatures within the traction battery 24, and voltages within the traction battery 24. A person having skill in this art and the benefit of this disclosure could understand how to monitor these, and other, conditions of a traction battery.

At a step 208, the method 200 compares a monitored pressure to a first threshold pressure, here 5 kilopascals. If the monitored pressure is not greater than the threshold pressure, the method 200 moves to a step 212 and continues to monitor. If the monitored pressure is greater than the threshold pressure, the method 200 moves to the step 216, which compares both a monitored temperature to a threshold temperature and a monitored voltage to a threshold voltage. The threshold temperature is 80 degrees Celsius in this example, and the threshold voltage is 1.5 Volts.

If the monitored temperature does not exceed the threshold temperature and the voltage does not exceed the threshold voltage, the method 200 moves to a step 220, which assesses whether or not the internal pressure continues to exceed the threshold pressure for a threshold time, say one minute. The threshold time can be calibratable.

If, at the step 220, the measurement of the internal pressure indicates that the internal pressure has continued to exceed the threshold pressure for the threshold time, the method 200 commands the valve 104 to transition from the flow restricting position to the flow permitting position. If not, the method 200 continues to monitor. Generally, at the step 220, the method 200 will monitor the internal pressure for a calibratable time, if the pressure condition remains true, the method 200 transitions the valve for another calibratable time. If the pressure condition does not remain true, the valve is closed.

If, at the step 216, the monitored temperature does exceed the threshold temperature or the voltage does exceed the threshold voltage, the method 200 moves to a step 222 where propulsion of the vehicle is stopped. The step 222 could include shutting down the engine 14, for example. From the step 222, the method 200 moves to a step 224 where the method 200 commands the valve 104 to transition from the flow restricting position to the flow permitting position for a set time, say thirty seconds. The set time can be calibratable.

The method 200 then, with the valve closed, moves to a step 228 where the internal pressure of the traction battery 24 is measured, and then, at a step 232 compared to the first threshold pressure. If the internal pressure does not exceed the first threshold pressure, the method 200 moves from the step 232 to the step 236 and continues to monitor. If the internal pressure does exceed the first threshold pressure, the method 200 moves from the step 232 to the step 240, where the internal pressure is compared to a second threshold pressure that is higher than the first threshold pressure. The second threshold pressure is 10 kilopascals in this example.

If the internal pressure does not exceed the second threshold pressure, the method 200 moves from the step 240 to the step 224. If the internal pressure does exceed the second threshold pressure, the method 200 moves to step 244, where the valve 104 is commanded to transition to the flow permitting position and stay in the flow permitting position for the remainder of the drive cycle.

Features of the disclosed examples include a battery vent system that can deliver battery vent byproducts to an engine exhaust system without disrupting the integrity of components of the engine exhaust system, such as a muffler or resonator. No separate opening from the battery vent system is visible outside the electrified vehicle, which can enhance the aesthetics of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery venting system, comprising:
an engine exhaust system that discharges engine exhaust gas to an area outside an electrified vehicle, the engine exhaust gas emitted from an internal combustion engine of the electrified vehicle;
a sound deadening device of the engine exhaust system;
a traction battery; and
a battery vent system that communicates battery vent byproducts to the engine exhaust system at a position that is downstream from the sound deadening device, the battery vent byproducts emitted from the traction battery of the electrified vehicle.

2. The traction battery venting system of claim 1, wherein the sound deadening device is a muffler.

3. The traction battery venting system of claim 1, wherein the sound deadening device comprises a resonator.

4. The traction battery venting system of claim 1, further comprising a tailpipe of the engine exhaust system, wherein the battery vent system opens to the tailpipe.

5. The traction battery venting system of claim 4, wherein engine exhaust gas entering the tailpipe is not mixed with battery vent byproducts, wherein engine exhaust gas exiting the tailpipe is mixed with battery vent byproducts.

6. The traction battery venting system of claim 4, wherein the engine exhaust system is configured such that the battery vent byproducts flows through no portion of the engine exhaust system other than the tailpipe.

7. The traction battery venting system of claim 1, further comprising a valve of the battery vent system, the valve configured to transition from a flow restricting position to a flow permitting position to permit battery vent byproducts to move to the engine exhaust system.

8. The traction battery venting system of claim 7, wherein the valve in the flow restricting position restricts flow of engine exhaust gas through the battery vent system.

9. The traction battery venting system of claim 1, wherein downstream is with reference to a direction that the engine exhaust gas flows through the engine exhaust system from the internal combustion engine to the area outside the electrified vehicle.

10. The traction battery venting system of claim 1, further comprising the internal combustion engine of the electrified vehicle.

11. A traction battery venting method, comprising:
using an engine exhaust system to discharge engine exhaust gas from an internal combustion engine to an area outside an electrified vehicle; and
using a battery vent system to communicate battery vent byproducts from a traction battery into the engine exhaust system at a position that is downstream from a sound deadening device of the engine exhaust system.

12. The traction battery venting method of claim 11, wherein the sound deadening device is a muffler.

13. The traction battery venting method of claim 11, wherein the sound deadening device comprises a resonator.

14. The traction battery venting method of claim 11, wherein the position is within a tailpipe of the electrified vehicle, the battery vent byproducts flowing through no structure of the engine exhaust system other than the tailpipe.

15. The traction battery venting method of claim 14, wherein engine exhaust gas entering the tailpipe is not mixed with battery vent byproducts, wherein engine exhaust gas exiting the tailpipe is mixed with battery vent byproducts.

16. The traction battery venting method of claim 11, further comprising, within a tailpipe of the electrified vehicle, mixing engine exhaust gas with battery vent byproducts.

17. The traction battery venting method of claim 11, further comprising transitioning a valve from a flow restricting position to a flow permitting position to permit flow of battery vent byproducts through the battery vent system to the engine exhaust system, the valve in the flow restricting position blocking a flow of engine exhaust gas through the battery vent system.

18. The traction battery venting method of claim 11, wherein downstream is with reference to a direction that the engine exhaust gas flows through the engine exhaust system from the internal combustion engine to the area outside the electrified vehicle.

\* \* \* \* \*